United States Patent [19]

Braun

[11] Patent Number: 5,385,066
[45] Date of Patent: Jan. 31, 1995

[54] MULTIPLE RATIO TRANSMISSION

[75] Inventor: Eugene R. Braun, Royal Oak, Mich.

[73] Assignee: Eaton Corporation, Cleveland, Ohio

[21] Appl. No.: 86,149

[22] Filed: Jul. 1, 1993

[51] Int. Cl.[6] ............................................. F16H 3/02
[52] U.S. Cl. ...................................... 74/331; 74/745
[58] Field of Search ........................ 74/331, 335, 745

[56] References Cited

U.S. PATENT DOCUMENTS

| | | | |
|---|---|---|---|
| 4,754,665 | 7/1988 | Vandervoort | 74/745 |
| 4,966,048 | 10/1990 | Braun | 74/745 |
| 5,062,313 | 11/1991 | Fletcher | 74/745 X |
| 5,105,675 | 4/1992 | Langford et al. | 74/335 |
| 5,231,895 | 8/1993 | Shine | 74/745 |

Primary Examiner—Dirk Wright
Assistant Examiner—Khoi Q. Ta
Attorney, Agent, or Firm—Brooks & Kushman

[57] ABSTRACT

A multiple ratio transmission includes an auxiliary countershaft assembly including a auxiliary countershaft, a first auxiliary countershaft gear fixed for rotation on the auxiliary countershaft and constantly meshed with an output shaft range gear, and a second auxiliary countershaft gear rotationally fixed to the auxiliary countershaft and constantly meshed with an intermediate shaft output gear for coupling either the intermediate shaft or main countershaft of a main transmission section thereby allowing fewer gears to be utilized to achieve a desired number of speed ratios.

19 Claims, 9 Drawing Sheets

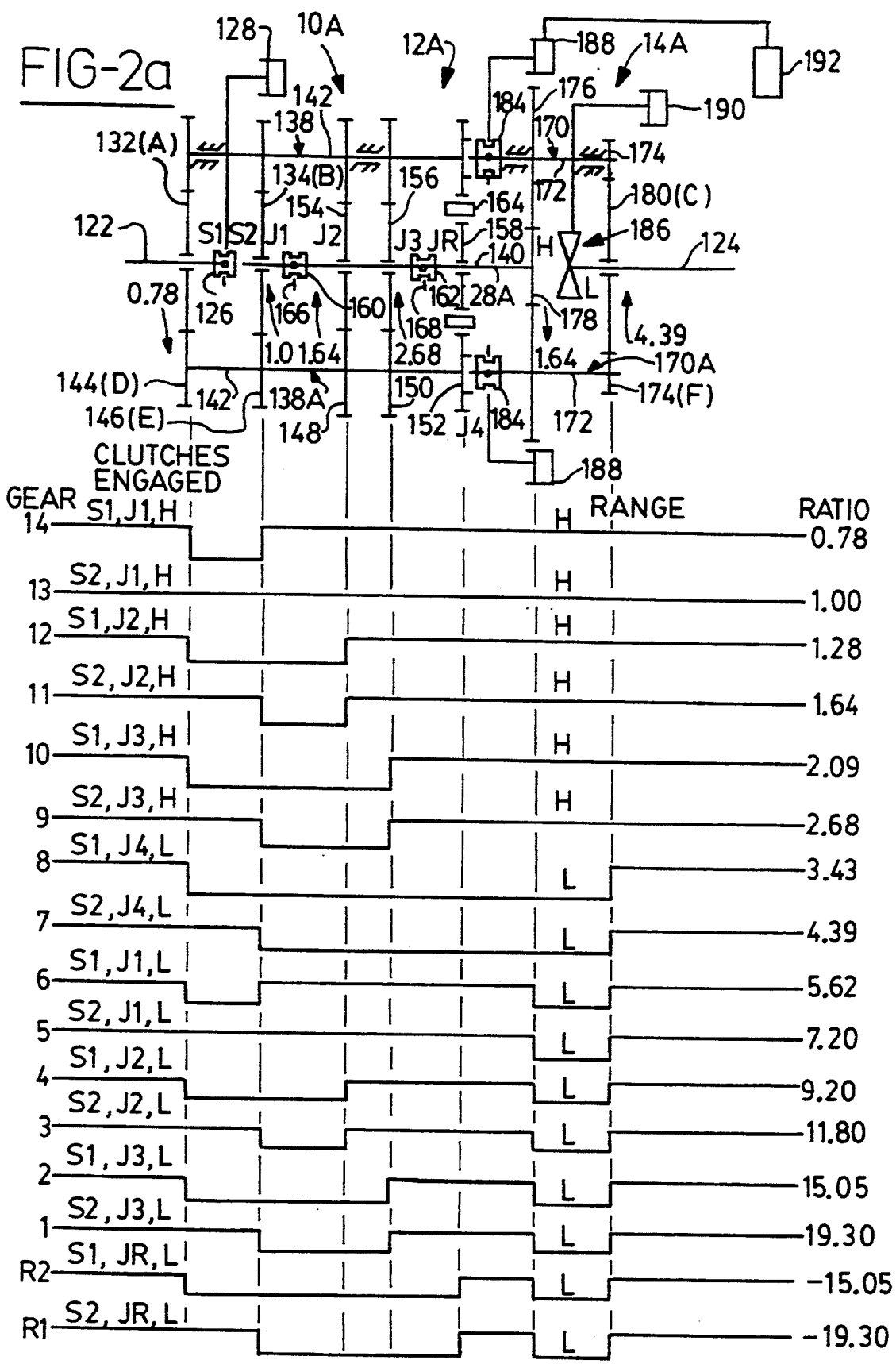

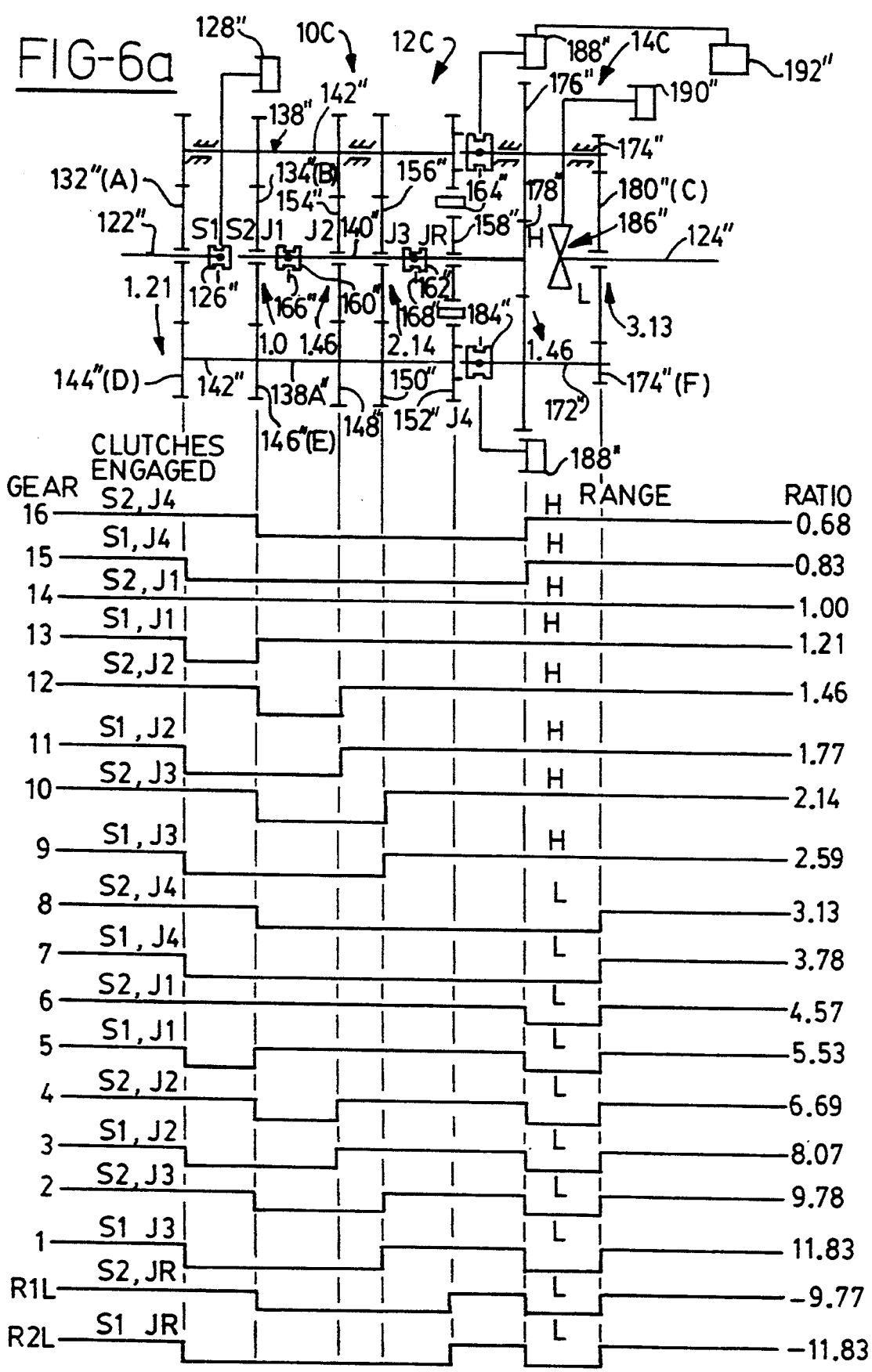

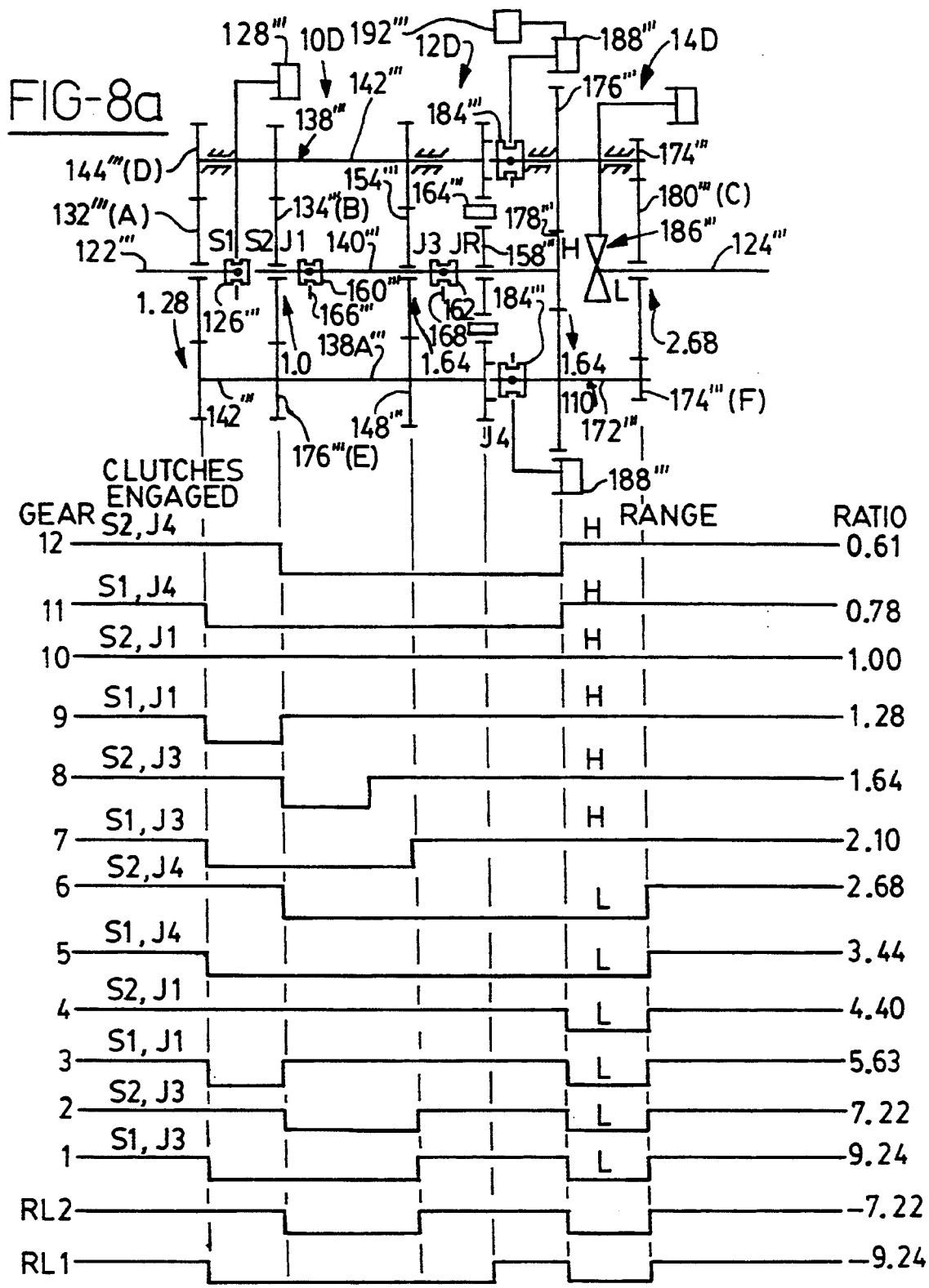

MULTIPLE RATIO TRANSMISSION

TECHNICAL FIELD

The present invention relates to compound transmissions having an auxiliary transmission section connected in series with a multispeed main transmission section and, more particularly, to an improved auxiliary transmission section including an auxiliary countershaft gear assembly providing selectable countershaft input for the auxiliary transmission section.

BACKGROUND ART

Compound change gear transmissions of the type having one or more auxiliary sections connected in series with a main transmission section are well known in the prior art. Briefly, by utilizing main and auxiliary transmission sections connected in series, assuming proper sizing of the ratio steps, the total of available transmission ratios is equal to the product of the main and auxiliary section ratios. By way of example, at least in theory, a compound change gear transmission comprising a four (4) speed main section connected in series with a three (3) speed auxiliary section will provide twelve (4×3=12) available ratios.

Auxiliary transmission sections are of three general types: range type, splitter type or combined range/splitter type.

In compound transmissions having a range type auxiliary section, the ratio step or steps may be greater, equal or less than the total ratio coverage of the main transmission section and the main section is shifted progressively through its ratios in each range. Examples of compound transmissions having range type auxiliary sections may be seen by reference to U.S. Pat. Nos. 3,105,395; 2,637,222 and 2,637,221, the disclosures of which are hereby incorporated by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. Nos. 4,290,515; 3,799,002; 4,440,037 and 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing the main section ratios to be split in at least one range.

One example of a compound transmission having a single combined range/splitter type auxiliary section may be seen by reference to U.S. Pat. Nos. 3,283,613; 3,648,546, the disclosures of which are hereby incorporated by reference and to publication Small Scale Print No. 016-AD; Fuller Transmissions; Models RT-14613, RTO-14613, RTOO-14613, published March 1981 by Eaton Corporation, assignee of this invention, the disclosure of which is hereby incorporated by reference. Another example is the "Ecosplit" model of transmission sold by Zahnradfabrik Friedrichshafen Aktiengeseushaft of Friedrichshafen, Federal Republic of Germany which utilizes a separate splitter auxiliary section in front of, and a separate range auxiliary section behind, the main transmission section.

It should be noted that the terms main and auxiliary sections are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forward speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

A conventional auxiliary transmission section such as that disclosed in U.S. Pat. No. 4,754,665 includes an auxiliary section input shaft and an output shaft cooperably forming a mainshaft assembly, and an auxiliary countershaft assembly. The auxiliary transmission section includes three gear layers, combined range and splitter gearing and four distinct selectable auxiliary section ratios.

DISCLOSURE OF INVENTION

An object of the present invention is to provide a new and improved compound change gear transmission that utilizes fewer gears to achieve a desired number of speeds.

Another object of the present invention is to provide an improved compound change gear transmission including a selectively clutchable countershaft eliminating excessive gearing to establish selectable torque flow paths between a main transmission section input shaft and an auxiliary transmission section output shaft.

A further object of the present invention is to provide a new and improved compound change gear transmission which includes an auxiliary transmission section having an auxiliary countershaft assembly providing selectable inputs through the auxiliary countershaft to drive the output shaft.

In carrying out the above objects, the compound transmission comprises an intermediate shaft disposed between transmission input and output shafts and a main countershaft. A torque input splitter gear is coaxial with and rotatable relative to the input shaft. A second splitter gear coaxial with the input and intermediate shafts is mounted for rotational engagement with the input and intermediate shafts. A plurality of intermediate shaft drive gears is mounted rotatably on the intermediate shaft and a plurality of main countershaft gears is fixed for rotation with the main countershaft. The splitter gear and intermediate shaft drive gears are selectively clutchable and in continuous meshing engagement with the main countershaft gears. An intermediate shaft output gear is fixed for rotation with the intermediate shaft and an output shaft range gear is coaxial with and rotatable relative to the output shaft.

A two-way synchronizer coupling is fixed for rotation with the output shaft and operable for coupling the intermediate shaft output gear and also for coupling the output shaft splitter gear to the output shaft. The transmission also includes an auxiliary countershaft assembly comprising a auxiliary countershaft a first auxiliary countershaft gear fixed for rotation on the auxiliary countershaft and constantly meshed with the output shaft splitter gear, and a second auxiliary countershaft gear surrounding the auxiliary countershaft and constantly meshed with the intermediate shaft output gear. A clutch assembly fixed for rotation on the auxiliary countershaft has a position for selectively coupling the auxiliary countershaft to the main countershaft.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2a is a schematic illustration of a first embodiment of an improved compound transmission having fourteen forward speeds including an auxiliary countershaft assembly constructed in accordance with the present invention;

FIG. 2b is a ladder diagram of the plurality of torque flow paths through the compound transmission of FIG. 2a;

FIG. 3a is a schematic illustration of the shift pattern for the transmission of FIG. 2a;

FIG. 4a is a schematic illustration of a second embodiment of the improved compound transmission having ten forward speeds;

FIG. 4b is a ladder diagram of the plurality of torque flow paths through the compound transmission of FIG. 4a;

FIG. 5a is a schematic illustration of the shift pattern for the transmission of FIG. 4a;

FIG. 6a is a schematic illustration of a third embodiment of the improved compound transmission having sixteen forward speeds;

FIG. 6b is a ladder diagram of the plurality of torque flow paths through the compound transmission of FIG. 2a;

FIG. 7a is a schematic illustration of the shift pattern for the transmission of FIG. 6a;

FIG. 8a is a schematic illustration of a fourth embodiment of the improved compound transmission having twelve forward speeds;

FIG. 8b is a ladder diagram of the plurality of torque flow paths through the compound transmission of FIG. 8a;

FIG. 9a is a schematic illustration of the shift pattern for the transmission of FIG. 8a.

BEST MODE FOR CARRYING OUT THE INVENTION

Figure 1:
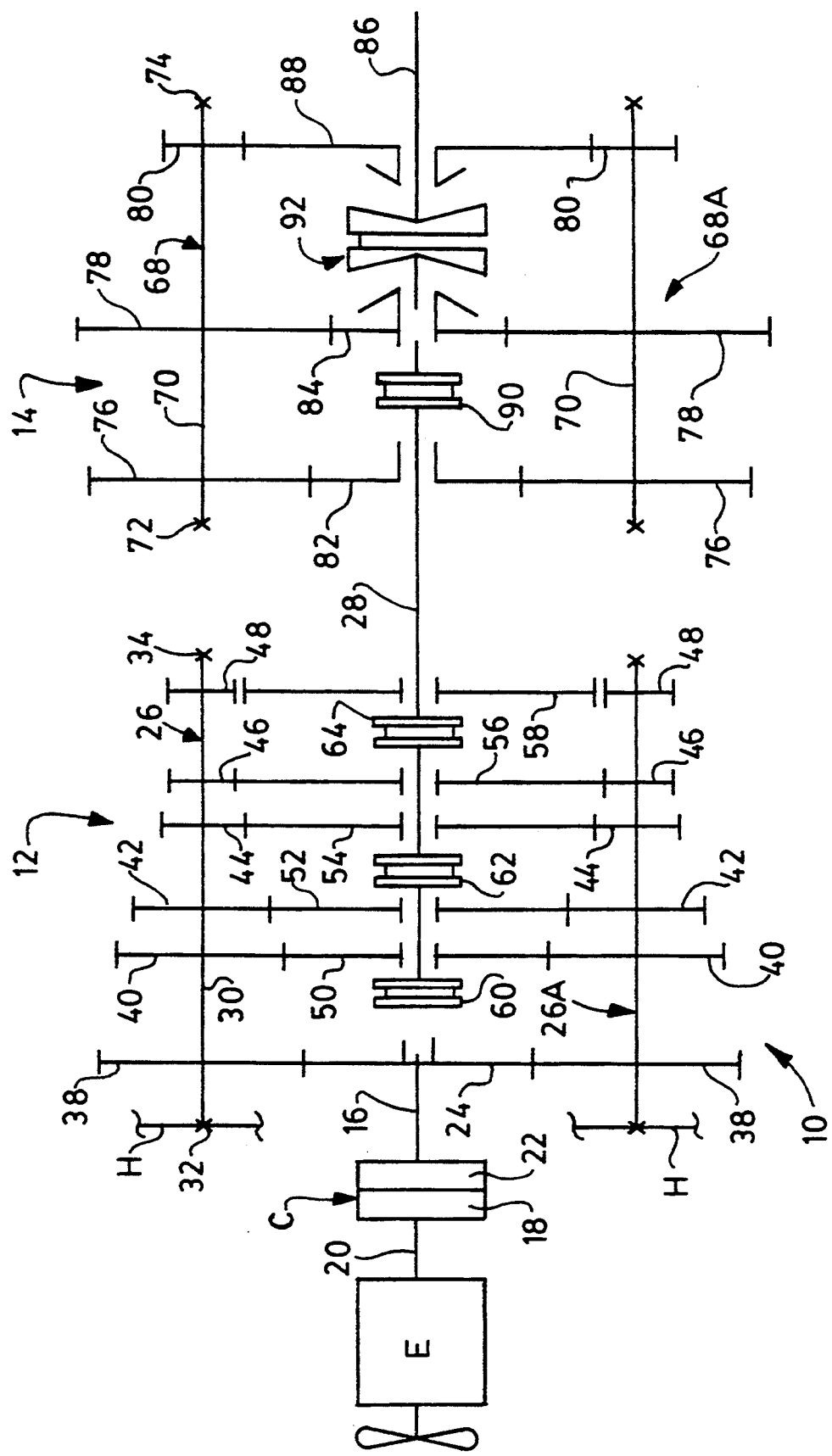
FIG. 1 is a schematic illustration of a prior art compound transmission section having a multispeed main transmission section connected in series with an auxiliary transmission section.

Certain terminology will be used in the following description for convenience only and will not be limiting The words "upwardly" "downwardly" "rightwardly", and "leftwardly" will designate directions in the drawings to which reference is made. The words "forward" and "rearward" will refer respectively to the front and rear ends of the transmission as conventionally mounted in the vehicle, being respectively to the left and right sides of the prior art main transmission section illustrated in FIG. 1.

The term "compound transmission" is used to designate a change speed or change gear transmission having a main transmission section and an auxiliary transmission section connected in series whereby the selected gear reduction in the main transmission section may be compounded by further selected gear reduction in the auxiliary transmission section. The term "upshift" as used herein shall mean the speed gear ratio is changed from a lower value to a higher value. The term "downshift" as used herein shall means the shifting from a higher speed gear ratio to a lower speed gear ratio. The terms "low speed gear" or "low gear" as used herein shall designate a gear ratio utilized for relatively lower forward speed operation in a transmission, i.e. a set of gears having a higher ratio of reduction of output shaft speed relative to the speed of the input shaft. "Synchronized clutch assembly" and words of similar import shall designate a clutch assembly utilized to non-rotatably couple a selected gear to a shaft by means of a positive clutch in which attempted engagement of said clutch is prevented until the members of the clutch are at substantially synchronous rotation and relative large capacity friction means are associated with the clutch members and are sufficient, upon initiation of a clutch engagement, to cause the clutch members and all members rotating therewith to rotate at a substantially synchronous speed.

Referring now to FIG. 1, there is schematically illustrated a well known and highly commercially successful eighteen forward speed compound transmission 10. Transmission 10 comprises a main transmission section 12 connected in series with an auxiliary transmission section 14. Typically, the transmission 10 is housed in a single housing and includes an input shaft 16 driven by a prime mover such as diesel engine E through a selectively disengaged, normally engaged friction master clutch C having an input or driving section 18 drivingly connected to the engine crankshaft 20 and a driven portion 22 rotatably fixed to the transmission input shaft.

In the main transmission section 12, the input shaft 16 carries an input gear 24 for simultaneously driving a plurality of substantially identical main section countershaft assemblies 26 and 26a at substantially identical rotational speeds. In the transmission 10 illustrated, two substantially identical main section countershaft assemblies are provided on diametrically opposite sides of a mainshaft 28, which mainshaft is generally coaxially aligned with the input shaft 16. Each of the main section countershaft assemblies 26 and 26a comprises a main section countershaft 30 supported by bearings 32 and 34 in housing H, only a portion of which is schematically illustrated.

Each of the main section countershafts 30 is provided with an identical grouping of main section countershaft gears 38, 40, 42, 44, 46 and 48, fixed for rotation therewith. A plurality of main section drive or mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the art. Clutch collar 60 may also be utilized to clutch input gear 24 to mainshaft 28 to provide a direct drive relationship between input shaft 16 and mainshaft 28. Preferably, each of the main section mainshaft gears encircles the mainshaft 28 and is in continuous meshing engagement with and is floatingly supported by the associated countershaft gear group.

Typically, clutch collars 60, 62 and 64 are axially positioned by means of shift forks (not illustrated) associated with a shift bar housing assembly (not illustrated) as well known in the prior art. Clutch collars 60, 62 and 64 are of the well known non-synchronized double acting jaw clutch type.

With continued reference to FIG. 1, main section mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio namely, that ratio provided by drivingly connected mainshaft drive gear 56 to mainshaft 28 is often of such a high gear reduction as to be considered a low or "creeper" gear which is utilized only for starting of a vehicle under severe conditions and is usually not utilized in the high transmission range and/or may not be split in the low transmission range.

Jaw clutches 60, 62 and 64 are three-position clutches in that they may be positioned in a centered, non-engaged position as illustrated or in a fully rightwardly engaged or fully leftwardly engaged position.

Auxiliary transmission section 14 includes two substantially identical auxiliary countershaft assemblies 68 and 68A, each comprising an auxiliary countershaft 70 supported by bearings 72 and 74 in housing H and carrying three auxiliary section countershaft gears 76, 78 and 80 fixed for rotation therewith. Auxiliary countershaft gears 76 are constantly meshed with and support auxiliary section splitter gear 82 which surrounds mainshaft 28. Auxiliary countershaft gears 78 are constantly meshed with and support auxiliary section splitter/range gear 84 which surrounds the output shaft 86 at the end thereof adjacent the coaxial end of mainshaft 28. Auxiliary section countershaft gears 80 constantly mesh and support auxiliary section range gear 88, which surrounds the output shaft 86. Accordingly, auxiliary section countershaft gears 76 and splitter gear 82 define a first gear layer, auxiliary section countershaft gears 78 and splitter/range gear 84 define a second gear layer and auxiliary section countershaft gears 80 and range gear 88 define a third layer, or gear group of the combined splitter and range type auxiliary transmission section 14.

A sliding two position jaw clutch collar 90 is utilized to selectively couple either the splitter gear 82 or the splitter/range gear 84 to the mainshaft 28, while a two position synchronized assembly 92 is utilized to selectively couple the splitter/range gear 84 or the range gear 88 to the output shaft 86.

Referring to FIGS. 2a, 4a, 6a and 8a, each figure schematically illustrates an improved compound transmission 10A, 10B, 10C and 10D including the improved auxiliary transmission section 14A, 14B, 14C and 14D of the present invention. Compound transmissions 10A-10B comprise main transmission sections 12A, 12B, 12C and 12D and are similar to main transmission section 12 described above in reference to prior art transmission 10.

Transmission sections 12A-12D have different numbers of intermediate driveshaft gears and corresponding countershaft gears as hereinafter described and illustrated in the drawings. In main transmission sections 12A-D the main countershafts are selectively coupleable to the auxiliary section countershafts for driving auxiliary transmission sections 14A-14D and reducing the number of gears required for a desired number of speed ratios as hereinafter more fully described. Immediately following, and by way of example, is a detailed description of the transmission of FIG. 2a, which description can easily also be applied to the transmissions illustrated in FIGS. 4a, 6a and 8a.

With continued reference to FIG. 2a, multiple ratio transmission 10A is a fourteen-forward speed, two-reverse speed, compound manually operated transmission wherein main transmission section 12A is connected in series to the auxiliary section 14A. The main transmission section 12A includes a two-speed input splitter section and multispeed intermediate section. Auxiliary section 14A includes a three speed range section. Typically transmission 10A is housed within a single housing (not shown) and includes an input shaft 122 driven by a prime mover (not shown) such as a well known diesel engine or the like.

In the main transmission section 12A input shaft 122 drives a two position clutch collar 126. Clutch collar 126 is actuated by an actuator 128 such as a two-position piston, or the like, and has a first position for engaging torque input splitter gear 132 to the input shaft and a second position for engaging the second splitter gear 134 to the input shaft. The input splitter section thus defines the first clutch S1 and second clutch S2 which are mutually exclusively engageable to couple torque input splitter gear 132 or second splitter gear 134 to the input shaft 122.

Torque input splitter gear 132 and second splitter gear 134 simultaneously drive a pair of substantially identical main section countershaft assemblies 138 and 138A at substantially identical rotation speeds. In the transmission illustrated, two substantially identical main section countershaft assemblies are provided on diametrically opposite sides of an intermediate shaft which is generally coaxially aligned with the input shaft 122 and output shaft 124. Each of the main section countershaft assemblies 138 and 138A, comprise a main section countershaft 142 supported by bearings and are provided with an identical grouping of main section countershaft gears 144, 146, 148, 150 and 152, fixed for rotation therewith. Main section drive gears 154, 156 and 158 surround the intermediate shaft 140 and are selectively clutchable, one at a time, to the intermediate shaft 140 for rotation therewith by sliding clutch collars 160 and 162 as is well known in the prior art. Clutch collar 160 may also be utilized to clutch second splitter gear 134 directly to intermediate shaft 140 to provide a direct driving relationship therebetween. Of course, with clutch S2 engaged, second splitter gear 134 will rotate with input shaft 122.

Main section drive gears 154,156 are in continuous meshing engagement with and floatingly supported by the associated main section countershaft gears 148,150 and main section intermediate shaft gear 158 is the reverse gear and is in continuous meshing engagement with countershaft gear 152 by means of conventional intermediate idler gears 164.

Main section clutch collars 160 and 162 are axially positioned by shift forks 166 and 168, respectively, and are typically manually controlled by means of a shift lever or the like, as is well known from the prior art. The clutch collars 160 and 162 are of the well known nonsynchronizing type of the well known double acting jaw clutch type.

It may be seen, that the manually controlled main section 12A defines six clutches S1,S2,J1,J2,J3 and JR, respectively, which are mutually exclusively engageable to drivingly couple either torque input second splitter gears 132,134, main section drive gears 154,156, or reverse intermediate section drive gear 158, respectively, to the input or intermediate shafts 122,140.

The combined range auxiliary section 14A includes two substantially identical auxiliary countershaft assemblies 170 and 170A, each comprising an auxiliary countershaft 172 supported by bearings in a housing and carrying two auxiliary section countershaft gears 174 and 176 fixed for rotation therewith. Auxiliary section countershaft gears 176 are constantly meshed with and support intermediate shaft output gear 178. Auxiliary countershaft gears 174 are constantly meshed with and support auxiliary section range gear 180 which surrounds the output shaft 124.

A sliding two-position jaw clutch collar 184 is utilized to selectively couple the main countershaft 142 to the auxiliary countershaft 172, thus defining a clutch J4. Clutch collar 184 is actuated by an actuator 188 such as a two position piston, or the like, and has a first position for engaging main countershaft 142 to auxiliary countershaft 172 and a second position wherein the countershafts are disengaged. Control means 192 responsive to gear shift position controls the position of the clutch collar.

Synchronized clutch assembly 186 defines two mutually exclusively engageable range torque flow paths H and L, respectively. In low range clutch assembly 186 is engageable to couple range gear 180 to the output shaft 124 and in high range clutch assembly 186 is engageable to couple intermediate shaft output gear 178 to the output shaft 124. Actuator 190 is a two-position fluid actuated piston for actuating selection of the desired torque flow path H,L.

The multiple ratio transmission 10A of FIG. 2a provides fourteen forward speeds utilizing 23 gears. Prior art transmissions have required 29 gears to achieve fourteen speeds without the use of coupling the main countershaft to the auxiliary countershaft. The shift pattern for shifting the fourteen forward speed transmission of FIG. 2a is illustrated in FIG. 3a with locations of the shift lever indicating the engagement of clutches in FIG. 3b. A first master control having two selectable positions defined by a two position button marked DIR and OD splits shifts for each position of the shift pattern. A second master control having two selectable positions allows operator selection of either one of two range ratios. Range shifting associated with each position of the shift pattern is illustrated with high range being the upper half of the circle and low range being the lower half of the circle which is selected by a two position button RF.

In FIG. 2a the engageable sides of the clutches along the mainshaft and intermediate shaft from forward to rearward are referenced S1, S2, J1, J2, J3 and JR. The engageable side of clutch 184 in the auxiliary assembly 14A is referenced J4 and synchronizer coupling 186 references its high and low range H and L respectively.

Figure 3B:
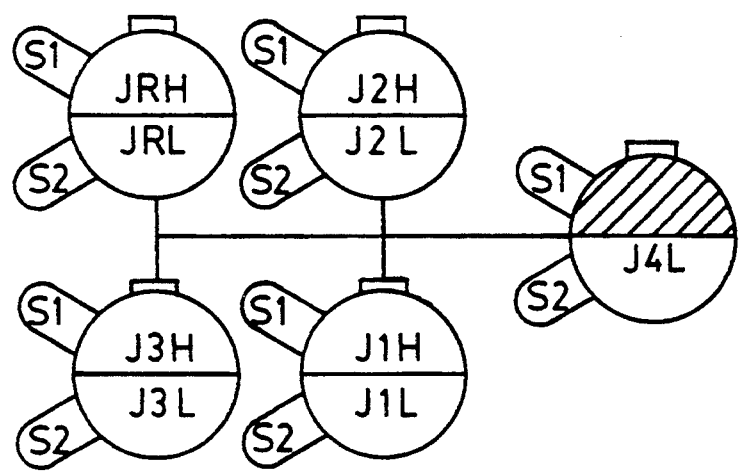
FIG. 3b is another schematic illustration of the shift pattern of FIG. 3a illustrating which side of the gear clutches in FIG. 2a are engaged in each position of the shift pattern.
Figure 3A:
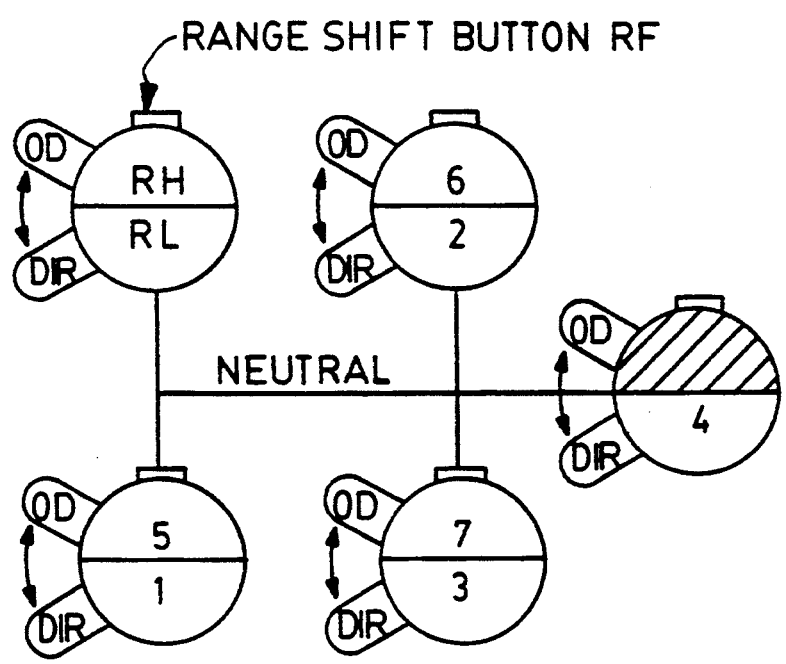

FIG. 3b illustrates the condition of clutches found in FIG. 2a for each position of the shift pattern illustrated in FIG. 3a. As may be seen, operation of transmission 10A from the lowest speed ratio, first speed, to the highest speed ratio, fourteen speed, requires only six movements of the shift lever. The ladder diagram of FIG. 2b illustrates the torque flow paths through the transmission of FIG. 2a for each shift position of FIGS. 3a and 3b. The speed ratios represented on the torque flow paths for each of forward and reverse speeds are illustrative and are just one example of implementation wherein assumptions were made to provide equal steps between speed ratios in the main transmission section between the second splitter gear and auxiliary countershaft input and wherein the lowest overall transmission speed ratio would be about 20 to 1 and the highest overall transmission speed ratio would be about 0.8 to 1. Given these assumptions, the ratios as illustrated in FIG. 2b are obtainable.

In the main transmission section 12A, the number of teeth on the torque input splitter gear is referenced A, the number of teeth on the second splitter gear is referenced B, the number of teeth on the first countershaft gear is referenced D and the number of teeth on the second countershaft gear is referenced E. In the auxiliary section 14A, the number of teeth on the range gear is referenced C and the number of teeth on the first secondary countershaft gear is referenced F.

The average transmission ratio step is generally equal to $(A/D) \times (E/B)$. $(C/F) \times (E/B)$ is generally equal to the average transmission ratio step raised to the 2N power, where N equals the number of selectable transmission forward speed ratios in the intermediate section utilized in both high and low ranges.

Figures 4A, 4B:
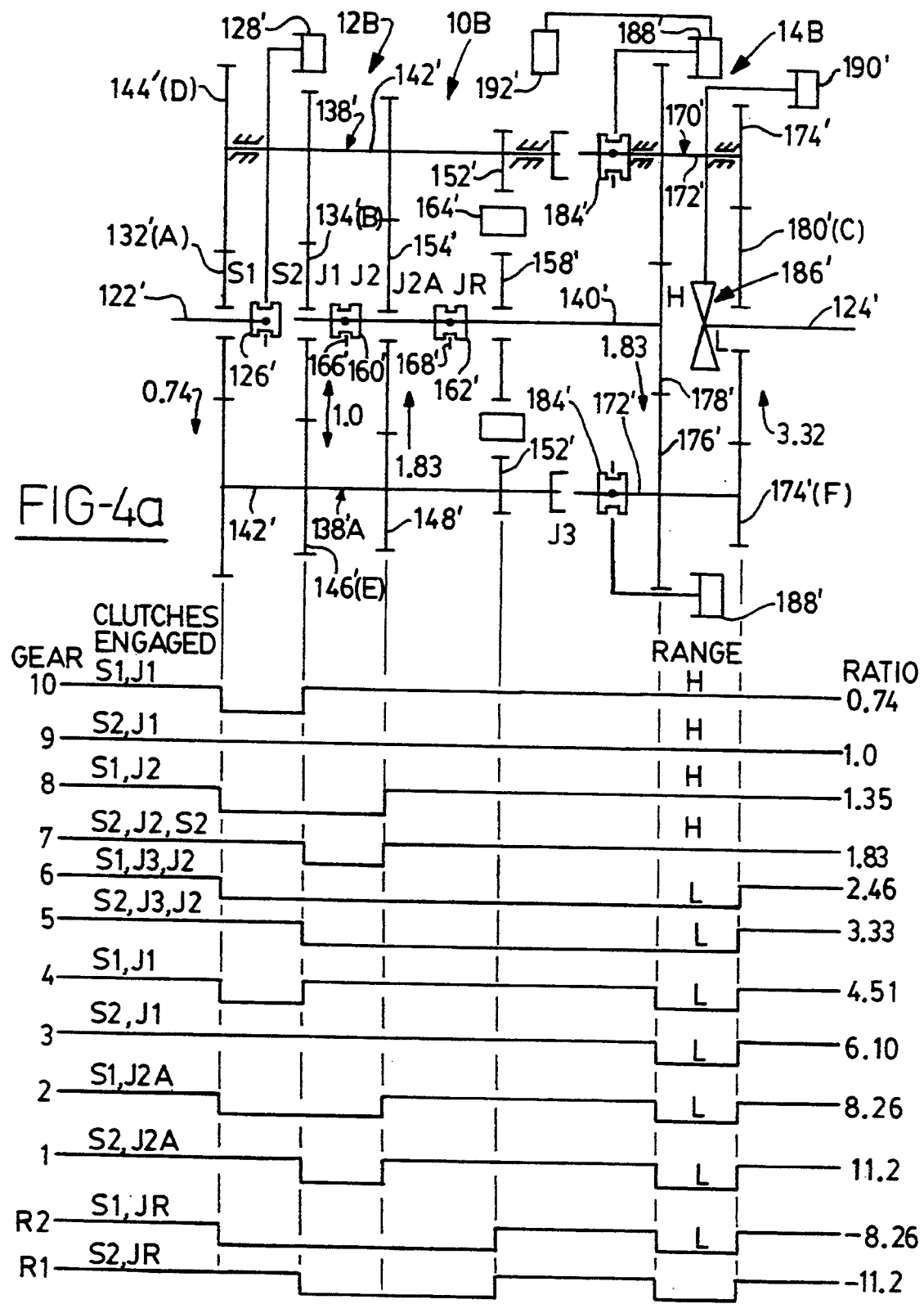

In FIG. 4a, the multiple ratio transmission 10B is a ten forward speed transmission utilizing 20 gears rather than the currently used 23 gears. The shift pattern for shifting the 10 forward speed transmission of FIG. 4a is illustrated in FIG. 5a. A two position button on the side of the circle illustrates splitter shifts for each position of the shift pattern. Range shifting is done automatically moving from 5/6 to ⅞ in the shift pattern as illustrated with reference to high range and low range arrows.

In FIG. 4a the engageable sides of the clutches along the mainshaft and intermediate shaft from forward to rearward are referenced S1, S2, J1, J2, J2A and JR. The engageable side of clutch 184 in the auxiliary assembly is referenced J3 and synchronizer coupling 186 references its high and low range H & L respectively. In the main transmission section 12A, the number of teeth on the torque input splitter gear is referenced A, the second splitter gear is referenced B, the number of teeth on the first countershaft gear is referenced D and the number of teeth on the second countershaft gear is referenced E. In the auxiliary section 14B, the number of teeth on the range gear is referenced C and the number of teeth on the first secondary countershaft gear is referenced F.

Figure 5B:
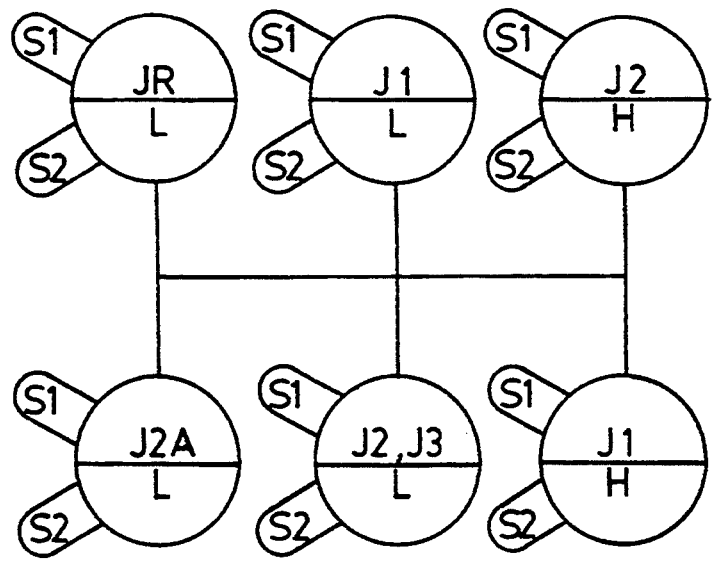
FIG. 5b is another schematic illustration of the shift pattern of FIG. 5a illustrating which side of the gear clutches in FIG. 4a are engaged in each position of the shift pattern.
Figure 5A:
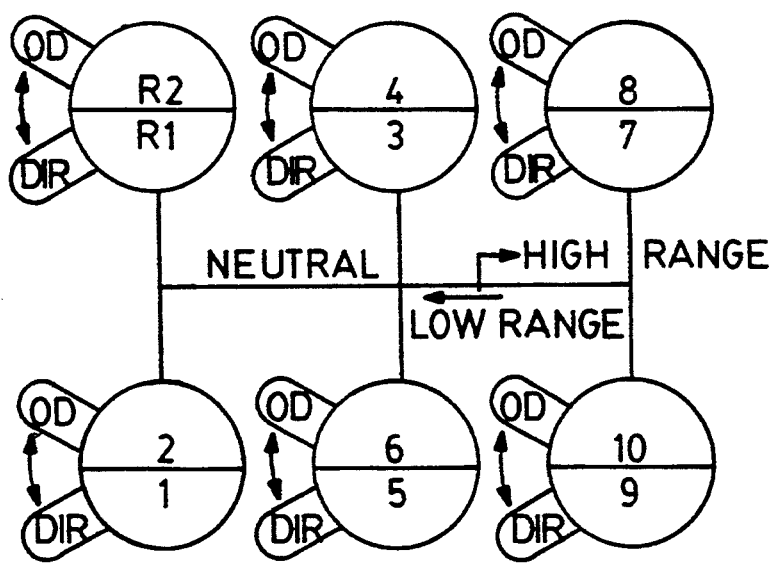

FIG. 5b illustrates the condition of engaged clutches found in FIG. 4a for each position of the shift pattern illustrated in FIG. 5a. As may be seen, operation of transmission 10B from the lowest speed ratio, first speed, to the highest speed ratio, tenth speed, requires only four movements of the shift lever. The ladder diagram of FIG. 4b illustrates the torque flow paths through the transmission of FIG. 4a for each shift position of FIGS. 5a and 5b. The speed ratios represented on the torque flow paths for each of forward and reverse speeds are illustrative and are just one example of implementation wherein assumptions were made to provide equal steps between speed ratios in the main transmission section between the second splitter gear and auxiliary countershaft input and wherein the lowest ratio would be about 11 to 1 and the highest ratio would be about 0.8 to 1. Given these assumptions, the ratios as illustrated in FIG. 4b are obtainable.

In this transmission, the average transmission ratio step is generally equal to $(A/D) \times (E/B)$ and $(C/F) \times (E/B)$ is generally equal to the average transmission ratio step raised to the 2N power, where N equals the number of selectable transmission forward speed ratios in the intermediate section utilized in both high and low ranges.

The multiple ratio transmission 10C of FIG. 6a provides sixteen forward speeds utilizing 23 gears. Prior art transmissions have required 29 gears to achieve sixteen speeds without the use of coupling the main countershaft to the auxiliary countershaft. The shift pattern for shifting the sixteen forward speed transmission of FIG. 6a is illustrated in FIG. 7a with locations of the shift lever indicating the engagement of clutches in FIG. 7b. A first master control having two selectable positions defined by a two position button marked DIR and OD splits shifts for each position of the shift pattern. A second master control having two selectable positions allows operator selection of either one of two range ratios. Range shifting associated with each position of the shift pattern is illustrated with high range being the upper half of the circle and low range being the lower half of the circle which is selected by a two position button RF.

In FIG. 6a the engageable sides of the clutches along the mainshaft and intermediate shaft from forward to rearward are referenced S1, S2, J1, J2, J3 and JR. The engageable side of clutch 184 in the auxiliary assembly 14C is referenced J4 and synchronizer coupling 186 references its high and low range H and L respectively. Preferably clutch J4 is automatic although it can also be mechanically actuated.

Figure 7B:
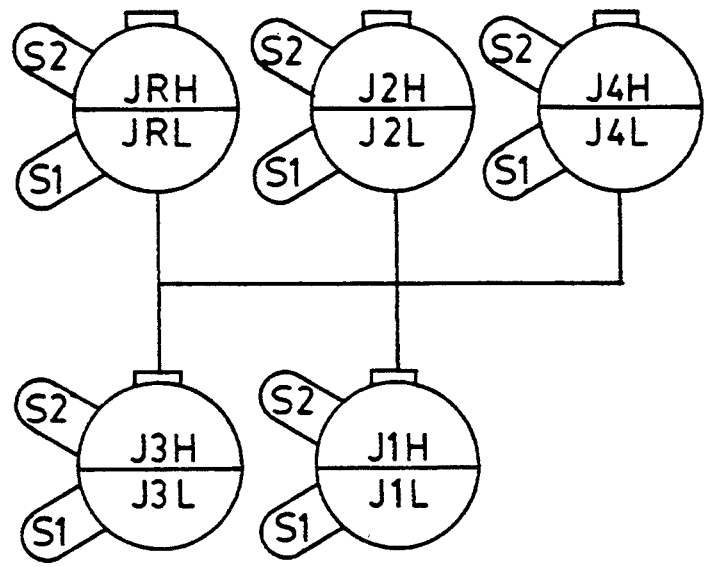
FIG. 7b is another schematic illustration of the shift pattern of FIG. 7a illustrating which side of the gear clutches in FIG. 6a are engaged in each position of the shift pattern.
Figure 7A:
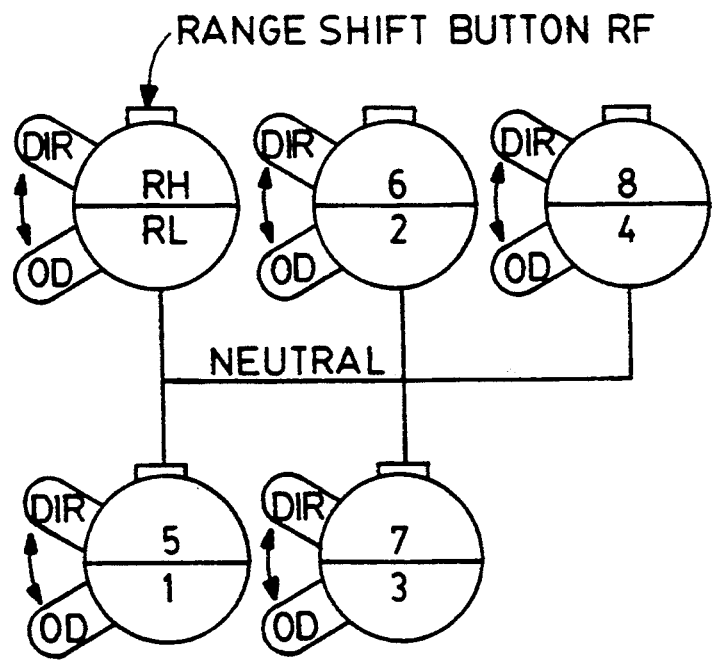

FIG. 7b illustrates the condition of clutches found in FIG. 6a for each position of the shift pattern illustrated in FIG. 7a. As may be seen, operation of transmission 10A from the lowest speed ratio, first speed, to the highest speed ratio, sixteen speed, requires only seven movements of the shift lever. The ladder diagram of FIG. 6b illustrates the torque flow paths through the transmission of FIG. 6a for each shift position of FIGS. 7a and 7b. The speed ratios represented on the torque flow paths for each of forward and reverse speeds are illustrative and are just one example of implementation wherein assumptions were made to provide equal steps between speed ratios in the main transmission section between the second splitter gear and auxiliary countershaft input and wherein the lowest overall transmission speed ratio would be about 12 to 1 and the highest overall transmission speed ratio would be about 0.7 to 1. Given these assumptions, the ratios as illustrated in FIG. 6b are obtainable.

In the main transmission section 12C, the number of teeth on the torque input splitter gear is referenced A, the number of teeth on the second splitter gear is referenced B, the number of teeth on the first countershaft gear is referenced D and the number of teeth on the second countershaft gear is referenced E. In the auxiliary section 14C, the number of teeth on the range gear is referenced C and the number of teeth on the first secondary countershaft gear is referenced F.

The average transmission ratio step is generally equal to $(D/A) \times (E/B)$ and $(C/F) \times (E/B)$ is generally equal to the average transmission ratio step raised to the 2N power, where N equals the number of selectable transmission forward speed ratios in the intermediate transmission section utilized in both high and low ranges.

The multiple ratio transmission 10D of FIG. 8a provides twelve forward speeds utilizing 20 gears. Prior art transmissions have required 26 gears to achieve twelve speeds without the use of coupling the main countershaft to the auxiliary countershaft. The shift pattern for shifting the twelve forward speed transmission of FIG. 8a is illustrated in FIG. 9a with locations of the shift lever indicating the engagement of clutches in FIG. 9b. A first master control having two selectable positions defined by a two position bottom marked DIR and OD splits shifts for each position of the shift pattern. A second master control having two selectable positions allows operator selection of either one of two range ratios. Range shifting associated with each position of the shift pattern is illustrated with high range being the upper half of the circle and low range being the lower half of the circle which is selected by a two position button RF.

In FIG. 8a the engageable sides of the clutches along the mainshaft and intermediate shaft from forward to rearward are referenced S1, S2, J1, J3 and JR. The engageable side of clutch 184 in the auxiliary assembly 14D is referenced J4 and synchronizer coupling 186 references its high and low range H and L respectively.

Figure 9B:
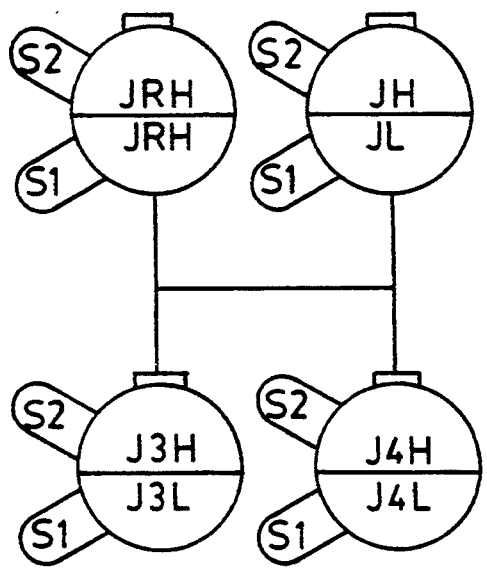
FIG. 9b is another schematic illustration of the shift pattern of FIG. 9a illustrating which side of the gear clutches in FIG. 8a are engaged in each position of the shift pattern.
Figure 9A:
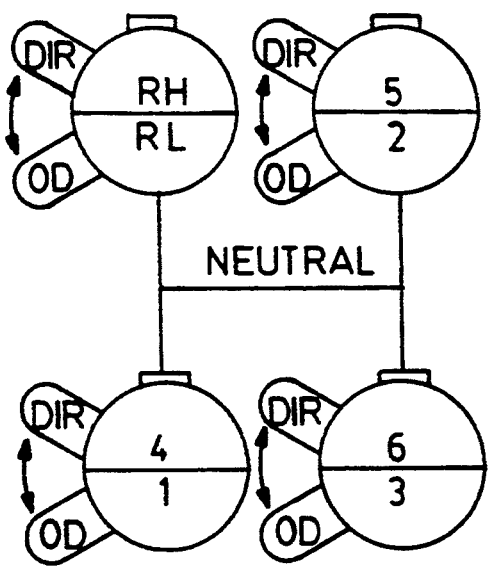

FIG. 9b illustrates the condition of clutches found in FIG. 8a for each position of the shift pattern illustrated in FIG. 9a. As may be seen, operation of transmission 10D from the lowest speed ratio, first speed, to the highest speed ratio, twelfth speed, requires only five movements of the shift lever. The ladder diagram of FIG. 8b illustrates the torque flow paths through the transmission of FIG. 8a for each shift position of FIGS. 9a and 9b. The speed ratios represented on the torque flow paths for each of forward and reverse speeds are illustrative and are just one example of implementation wherein assumptions were made to provide equal steps between speed ratios in the main transmission section between the second splitter gear and auxiliary countershaft input and wherein the lowest overall transmission speed ratio would be about 10 to 1 and the highest overall transmission speed ratio would be about 0.6 to 1. Given these assumptions, the ratios as illustrated in FIG. 8b are obtainable.

In the main transmission section 12D, the number of teeth on the torque input splitter gear is referenced A, the number of teeth on the second splitter gear is referenced B, the number of teeth on the first countershaft gear is referenced D and the number of teeth on the second countershaft gear is referenced E. In the auxiliary section 14D, the number of teeth on the range gear is referenced C and the number of teeth on the first secondary countershaft gear is referenced F.

The average transmission ratio step is generally equal to (D/A)×(E/B). (C/F)×(E/B) is generally equal to the average transmission ratio step raised to the N power, where N equals the number of selectable transmission forward speed ratios in the intermediate transmission section utilized in both high and low ranges.

While the best mode for carrying out the invention has been described in detail, those familiar with the art to which this invention relates will recognize various alternative designs and embodiments for practicing the invention as defined by the following claims.

What is claimed is:

1. A multiple ratio transmission for transferring torque from an input shaft to an output shaft, the transmission comprising:
    an intermediate shaft disposed between the input and output shafts;
    a main countershaft;
    a torque input splitter gear coaxial with and rotatable relative to said input shaft;
    a second splitter gear coaxial with said input and intermediate shafts and rotatable relative to said intermediate shaft;
    a plurality of intermediate shaft drive gears mounted rotatably on said intermediate shaft;
    a plurality of main countershaft gears fixed for rotation with said main countershaft;
    said splitter gears and intermediate shaft drive gears being selectively clutchable and in continuous meshing engagement with said main countershaft gears;
    an intermediate shaft output gear fixed for rotation with said intermediate shaft;
    an output shaft range gear coaxial with and rotatable relative to the output shaft;
    a two-way synchronizer coupling means fixed for rotation with the output shaft and operable for coupling said intermediate shaft output gear and for coupling said output shaft range gear to said output shaft;
    an auxiliary countershaft assembly comprising an auxiliary countershaft, a first auxiliary countershaft gear fixed for rotation on said auxiliary countershaft and constantly meshed with said output shaft range gear, and a second auxiliary countershaft gear rotationally fixed to said auxiliary countershaft and constantly meshed with said intermediate shaft output gear; and
    a clutch assembly fixed for rotation on said auxiliary countershaft and having a position for coupling said auxiliary countershaft to said main countershaft.

2. The multiple ratio transmission of claim 1 wherein said second auxiliary countershaft gear is fixed for rotation on said auxiliary countershaft.

3. The multiple ratio transmission of claim 1 further including control means for positioning said clutch assembly in a selected one of the two positions thereof.

4. The multiple ratio transmission of claim 1 wherein said two-way synchronizer coupling is a synchronized clutch for both positions thereof.

5. The multiple ratio transmission of claim 1 wherein said two-way synchronizer coupling is a hydraulic clutch.

6. A multiple ratio transmission for transferring torque from an input shaft to an output shaft, the transmission comprising:
    an intermediate shaft disposed between the input and output shafts;
    a main countershaft;
    a torque input splitter gear coaxial with and rotatable relative to said input shaft;
    a second splitter gear coaxial with said input and intermediate shafts and rotatable relative to said intermediate shaft;
    third, fourth and fifth intermediate shaft splitter drive gears mounted rotatably on said intermediate shaft;
    first, second, third, fourth and fifth main countershaft gears fixed for rotation with said main countershaft; said first countershaft gear being in continuous meshing engagement with said torque input splitter gear; said second countershaft gear being in continuous meshing engagement with said second splitter gear; said third through fifth countershaft gears being in continuous meshing engagement with said third through fifth splitter drive gears;
    said splitter gears being selectively clutchable;
    an intermediate shaft output gear fixed for rotation with said intermediate shaft;
    an output shaft range gear coaxial with and rotatable relative to the output shaft;
    a two-way synchronizer coupling means fixed for rotation with the output shaft and operable for coupling said intermediate shaft output gear and for coupling said output shaft range gear to said output shaft;
    an auxiliary countershaft assembly comprising an auxiliary countershaft, a first auxiliary countershaft gear fixed for rotation on said auxiliary countershaft and constantly meshed with said output shaft range gear, and a second auxiliary countershaft gear rotationally fixed to said auxiliary countershaft and constantly meshed with said intermediate shaft output gear; and
    a clutch assembly fixed for rotation on said auxiliary countershaft and having a position for coupling said auxiliary countershaft to said main countershaft.

7. The transmission of claim 6 wherein said second auxiliary countershaft gear is fixed for rotation on said auxiliary countershaft.

8. A multiple ratio transmission for transferring torque from an input shaft to an output shaft, the transmission comprising:
    an intermediate shaft disposed between the input and output shafts;
    a main countershaft;
    a torque input splitter gear coaxial with and rotatable relative to said input shaft;
    a second splitter gear coaxial with said input and intermediate shafts and rotatable relative to said intermediate shaft;
    third and fourth intermediate shaft splitter drive gears mounted rotatably on said intermediate shaft;
    first, second, third and fourth main countershaft gears fixed for rotation with said main countershaft; said first countershaft gear being in continuous meshing engagement with said torque input splitter gear; said second countershaft gear being in continuous meshing engagement with said second splitter gear; said third and fifth countershaft gears being in continuous meshing engagement with said third and fourth splitter drive gears;
    said splitter gears being selectively clutchable;

an intermediate shaft output gear fixed for rotation with said intermediate shaft;

an output shaft range gear coaxial with and rotatable relative to the output shaft;

a two-way synchronizer coupling means fixed for rotation with the output shaft and operable for coupling said intermediate shaft output gear and for coupling said output shaft range gear to said output shaft;

an auxiliary countershaft assembly comprising an auxiliary countershaft, a first auxiliary countershaft gear fixed for rotation on said auxiliary countershaft and constantly meshed with said output shaft range gear, and a second auxiliary countershaft gear rotationally fixed to said auxiliary countershaft and constantly meshed with said intermediate shaft output gear; and a clutch assembly fixed for rotation on said auxiliary countershaft and having a position for coupling said auxiliary countershaft to said main countershaft.

9. The transmission of claim 8 wherein said second auxiliary countershaft gear is fixed for rotation on said auxiliary countershaft.

10. The transmission of claim 8 wherein said clutch assembly includes an actuating means which positions said clutch assembly.

11. The transmission of claim 10 further comprising a shift lever for selecting a transmission ratio and wherein said actuating means is controlled by a predetermined position of the shift lever.

12. The transmission of claim 10 wherein said actuating means comprises a two-position device and control means to position the clutch assembly.

13. The transmission of claim 1 further comprising a first master control having two selectable positions allowing operator selection of either one of two splitter ratios defined by a torque flow path through the torque input splitter gear and a torque flow path through the secondary splitter gear.

14. The transmission of claim 13 wherein said first master control comprises a selector member moveable to one of the two positions thereof and further comprising means for actuating engagement of the torque input splitter gear, a secondary splitter gear in response to the position of the selector member.

15. The transmission of claim 13 further comprising a second master control having two selectable positions allowing operator selection of either one of two range ratios defined by a torque flow path through the two-way synchronizer coupling in a first and second position thereof.

16. The transmission of claim 15 wherein said second master control comprises a switch member operable for switching to one of the two positions thereof and further comprising a two-position piston for actuating position selection of the two-way synchronizer in response to the position of the switch member.

17. The transmission of claim 15 wherein said first and second master control are mounted on a shift lever.

18. The transmission of claim 1, 6 and 8 wherein-said transmission defines a plurality of selectable forward speed ratios, having substantially equal ratio steps, between the second splitter gear and the auxiliary countershaft and wherein:

(D/A)×(E/B) is generally equal to an average transmission ratio step, and (C/F)×(E/B) is generally equal to the average transmission ratio step raised to a power equal to 2N, wherein A = number of teeth on the torque input splitter gear;
B = number of teeth on the second splitter gear
C = number of teeth on the output shaft range gear
D = number of teeth on the first countershaft gear;
E = number of teeth on the second countershaft gear;
F = number of teeth on the first auxiliary countershaft gear, and
N = number of selectable transmission section forward speed ratios utilized in both high and low range.

19. The transmission of claim 1, 6, and wherein said transmission defines a plurality of selectable forward speed ratios, having substantially equal ratio steps, between the second splitter gear and the auxiliary countershaft and wherein:

(A/D)×(E/B) is generally equal to an average transmission ratio step, and (C/F)×(E/B) is generally equal to the average transmission ratio step raised to a power equal to 2N, wherein A = number of teeth on the torque input splitter gear;
B = number of teeth on the second splitter gear
C = number of teeth on the output shaft range gear
D = number of teeth on the first countershaft gear;
E = number of teeth on the second countershaft gear;
F = number of teeth on the first auxiliary countershaft gear, and
N = number of selectable transmission section forward speed ratios utilized in both high and low range.

* * * * *

UNITED STATES PATENT AND TRADEMARK OFFICE
CERTIFICATE OF CORRECTION

PATENT NO. : 5,385,066
DATED : January 31, 1995
INVENTOR(S) : Eugene R. Braun

It is certified that error appears in the above-indentified patent and that said Letters Patent is hereby corrected as shown below:

Column 4, Line 8, after "limiting" and before "The" insert a --.--;

Column 14, Line 11, Claim 18, change "and" to --or--;

Column 14, Line 31, Claim 19, change "and: to --or 8--.

Signed and Sealed this

Sixth Day of June, 1995

*Attest:*

BRUCE LEHMAN

*Attesting Officer*  *Commissioner of Patents and Trademarks*